United States Patent [19]

Nametz et al.

[11] 4,280,952
[45] Jul. 28, 1981

[54] FLAME RETARDANT POLYSTYRENE PLASTIC COMPOSITIONS

[75] Inventors: Richard C. Nametz, Manchester; Paul O. Moore, Ann Arbor, both of Mich.

[73] Assignee: Velsicol Chemical Corporation, Chicago, Ill.

[21] Appl. No.: 115,834

[22] Filed: Jan. 28, 1980

Related U.S. Application Data

[63] Continuation-in-part of Ser. No. 924,325, Jul. 14, 1978, abandoned.

[51] Int. Cl.³ .......................... C08K 5/13; C08L 71/04
[52] U.S. Cl. ...................... 260/45.95 G; 260/DIG. 24
[58] Field of Search .................. 525/132, 905; 260/45.95 G, DIG. 24

[56] References Cited

U.S. PATENT DOCUMENTS

| | | | |
|---|---|---|---|
| 3,383,435 | 5/1968 | Cizek | 260/874 |
| 3,658,634 | 4/1972 | Yanagi et al. | 106/15 FP |
| 4,102,850 | 7/1978 | Cooper et al. | 260/33.6 AQ |

FOREIGN PATENT DOCUMENTS 1416585 12/1975 United Kingdom .

*Primary Examiner*—Lorenzo B. Hayes
*Assistant Examiner*—Amelia B. Yarbrough
*Attorney, Agent, or Firm*—Dietmar H. Olesch; Robert J. Schwarz

[57] ABSTRACT

Disclosed are plastic compositions comprising (i) polystyrene; (ii) a bis-phenoxy compound of the formula

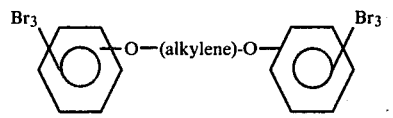

wherein alkylene is a straight chain carbon group having 1 to 6 carbon atoms; (iii) a poly (brominated phenylene oxide); and (iv) an enhancing agent. Also described is a flame retardant additive composition for polystyrene plastic compositions comprising (i) said bis-phenoxy compound, (ii) said poly (brominated phenylene oxide), and (iii) said enhancing agent.

4 Claims, No Drawings

FLAME RETARDANT POLYSTYRENE PLASTIC COMPOSITIONS

This application is a continuation-in-part of our co-pending application Ser. No. 924,325 filed July 14, 1978, now abandoned.

BRIEF SUMMARY OF INVENTION

The present invention relates to a polystyrene plastic composition containing a three-component flame retardant system.

DETAILED DESCRIPTION

U.S. Pat. No. 3,658,634 discloses a conjugate sheath and core fiber comprising a thermoplastic sheath polymer and a thermoplastic core polymer (both of which are disclosed as being either polyester or polyamide). The core polymer contains a two-component fire retardant system, i.e., (i) a halogenated aromatic fire retardant of the general formula

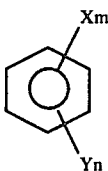

wherein X is the bromine or chlorine, Y is —R', —OR', and —OR"OR' (wherein R' is alkyl, aryl, aralkyl, alkaryl, and halogenated derivatives thereof and R" is an alkylene radical of from 1 to 6 carbon atoms) and n and m are positive integers satisfying the formula $6 \geq m \geq 1, 5 \geq n \geq 0$; and (ii) an organophosphorus compound. Bisphenoxyalkanes are disclosed as useful flame retardants in this patent.

Japanese patent publication 72/14500 teaches a flame retardant polyester composition comprising polyethylene terephthalate and a compound of the formula

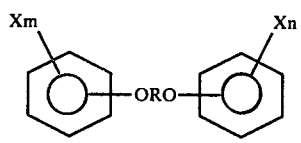

wherein X represents bromine or chlorine, m and n are each integers of 1 to 5, and R represents a halogen-free alkylene, phenylene or R'OR"R''' group where R', R", and R''' are alkyl or phenyl groups.

U.S. Pat. No. 3,383,435 discloses a thermoplastic composition comprising a polyphenylene ether and a styrene resin.

U.S. Pat. No. 3,717,609 discloses a flame retardant additive which consists of an organo-tin compound and a bromophenyl.

British Pat. No. 1,416,585 and German Patent Publication No. 2328520 disclose polystyrene compositions containing certain bisbromophenoxyalkane flame retardants and, optionally, enhancing agents such as antimony trioxide. While the bisphenoxy compounds disclosed therein are generally excellent flame retardants in polystyrene, they are less desirable when the flame retardant polymer is required to have a relatively high heat distortion temperature. These bisphenoxy compounds generally impart a relatively low heat distortion temperature to the polymeric system.

Other prior art also of interest in connection with this application include U.S. Pat. Nos. 3,717,609, 3,403,036, 3,819,761, 3,887,846, 3,883,613, 3,663,654, 3,660,531, and 3,639,506.

Polystyrene and uses therefor are well known in the art; see, e.g., *Polystyrene*, W. C. Teach and G. C. Kiessling (Reinhold Plastics Applications Series, Reinhold Publishing Corporation, New, 1960) and *Modern Plastics Encyclopedia* 1972-1973, Vol. 49:No. 10A, October, 1972, pages 97–99, 161 and 261–272.

The need for flame retarding polystyrenes has also been recognized in the art as is shown by, e.g., U.S. Pat. Nos. 3,347,882 and 3,422,048 and *Modern Plastics Encyclopedia*, ibid, pages 221, 222 and 456–458.

The prior art has specifically recognized that polymer systems differ substantially in both flammability characteristics and physical properties and there is no predictability whatsoever from one system to another. Thus, in the Norris et al. paper entitled "Toxicological and Environmental Factors Involved in the Selection of Decabromodiphenyl Oxide as a Fire Retardant Chemical", Applied Polymer Symposium No. 22, 195,219 (1973), the authors state: "a growing recognition of the high annual toll taken by fire is resulting in more stringent flamability requirements for synthetic polymers in a variety of applications. Because of economic constraints and the need to product flame resistant polymers without total replacement of existing manufacturing processes, increased flame resistance is generally achieved by incorporation of a fire retardant chemical in the finished product. This chemical is usually based on bromine, chlorine, phosphorus, or nitrogen and may either be chemically reacted or physically blended into the product. Since polymer systems differ markedly in both flammability characteristics and physical properties, selection of suitable flame retardant depends on a variety of factors that severely limits the number of acceptable materials."

". . . Some of the most important criteria for an acceptable flame retardant . . . are:

1. It must be as effective as possible to minimize both cost and effect on polymer properties. Use levels may range up to 15% by weight.

2. It must have sufficient stability to withstand conditions encountered during polymer processing and use. Processing conditions (blending, extrusion, and molding) often involve temperatures exceeding 300° C. The flame retardant must tolerate these conditions without degradation or volatilization. Also, attention must be given to hydrolytic stability and oxidative degradation, particularly under extended service at high temperatures.

3. It must be compatible with the base polymer and exert minimal adverse effect on those properties that give the polymer its value. Some of these critical properties are tensile strength, impact strength, heat deflection temperature, shear strength, and flexural modulus.

4. Finally, the flame retardant must not interfere with attainment of desired product esthetics and form."

"Because of the most stringent thermal stability requirements, only a very few compounds have been identified which can meet the necessary performance and economic criteria."

Disadvantages in the utilization of various prior art materials as flame retardants for plastic compositions include, without limitation, factors such as thermal migration, heat instability, light instability, non-biodegradability, toxicity, discoloration, the large amounts required for effectiveness, and the unpredictable end results obtained when using the same material in different plastics. For example, in *Modern Plastics Encyclopedia*, ibid, page 650, octabromobiphenyl is shown for use in polyolefins as a flame retardant but is not shown for use with the other 27 compositions listed.

The foregoing discussion is particularly applicable to the flame-retarding of polystyrene plastics. It is important that, in addition to retaining good physical characteristics, three properties of the polystyrene plastics. It is important that, in addition to retaining good physical characteristics, three properties of the polystyrene be within certain limitations in order to provide a functional product, viz., flame retardancy (as measured, for example, by UL 94), thermal stability (as measured, for example, by certain ASTM tests for decomposition and migration), and heat distortion temperature.

The prior at recognizes that prospective flame retardants must be adjudged on a case by case basis because of the unpredictable results obtained when an additive is incorporated into a polymeric system. For example, in U.S. Pat. No. 3,658,634, the patentee teaches (at column 1, lines 26–32), that ". . . the compounds containing chlorine or bromine atoms to be used as fire retardant agents are generally sublimated and therefore, the first retardant agents are sublimated and lost in the process for producing fire retardant polymers or in after finishing processes; accordingly, deteriorations of fire retardancy or difficulties in use tend to occur more often than not."

The prior art problem of providing a flame retarded polystyrene composition having the desired chemical, physical and mechanical properties has now been substantially solved by the present invention.

It has now been found that the addition of a certain poly (brominated phenylene oxide), to a polystyrene composition which contains a bisphenoxyalkane compound results in a composition which retains all of the excellent physical properties of a composition containing only those bisphenoxy compounds while additionally resulting in a significant improvement in the heat distortion temperature of said composition.

SUMMARY OF INVENTION

In accordance with this invention, there is provided a flame retardant plastic composition comprising: a polystyrene polymer and a flame retardant amount of a bis phenoxy compound of the formula

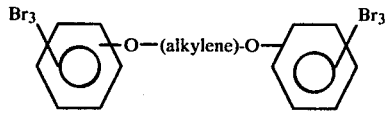

wherein alkylene is a straight chain carbon group having from one to six carbon atoms: a flame retardant enhancing agent; and a poly(brominated phenylene oxide) condensation product derived from tribromophenol, wherein said condensation product is a branched polymer having a hydroxyl number of from 2.8 to about 30 and the structural formula

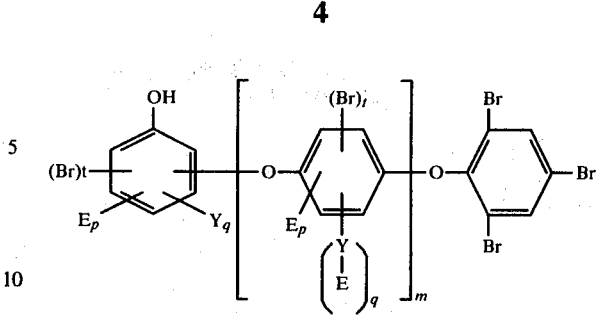

wherein each repeating unit set out within the brackets of the structural formula is attached in an ortho or para configuration to its adjacent phenyl and phenoxy moiety; and wherein E is an end group of the formula

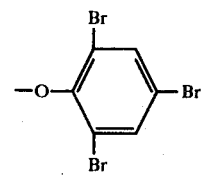

Y is a side chain of the same structure and configuration as said repeating unit; the substituents Br, E and Y on each phenyl ring ae attached only to the ortho or para positions relative the hydroxyl group in the structural formula and the oxygen atom in the repeating unit; each t, p and q are independently the integer 0 or 1, provided that the sum of t plus p plus q equals 2, and provided that from about 10 to about 80 percent of the repeating units have the side chain and end unit —Y—E attached thereto; and m is an integer such that the total molecular weight of the polymer ranges from about 2,000 to about 20,000.

DESCRIPTION OF PREFERRED EMBODIMENTS

The particular class of bis-tribromophenoxy compounds used in the present invention compositions have the formula:

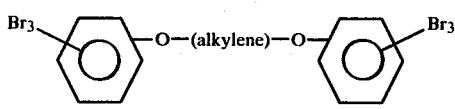

wherein alkylene is a straight chain carbon group having from 1 to 6 carbon atoms, and includes, without limitation, groups such as —CH$_2$—; —(CH$_2$)$_2$—; —(CH$_2$)$_3$—; —(CH$_2$)$_4$—; —(CH$_2$)$_5$—; and —(CH$_2$)$_6$—.

It is to be understood that all the compounds falling within formula I above and as heretofore defined are generically described herein as "bis-tribromophenoxy compounds".

Some non-limiting examples of compounds of formula I are 1,1-bis (2,4,6-tribromophenoxy) methane, 1,2-bis (2,4,6-tribromophenoxy) ethane; 1,2-bis (2,4,6-tribromophenoxy) propane; 1,4-bis (2,4,6-tribromophenoxy) butane; 1,5-bis (2,4,6-tribromophenoxy) pentane; 1,6-bis (2,4,6-tribromophenoxy) hexane; 1,1-bis (3,4,5-tribromophenoxy) methane; 1,2-bis (3,4,5-tribromophenoxy) ethane; 1,3-bis (2,4,5-tribromophenoxy) propane; 1,3-bis (2,3,4-tribromophenoxy) propane; and 1,1-bis (2,3,6-tribromophenoxy) propane.

The bis-tribromophenoxy compounds containing bromine substituents in the 2,4,6 positions are preferred from the standpoint of ease of production.

In general, the bis-tribromophenoxy compounds are prepared by reacting a halogenated phenol with a halogenated alkane at elevated temperatures in the presence of a basic material such as alkali metal hydroxides, carbonates, bicarbonates, oxides and hydrides. The preferred alkali metals are potassium and sodium. Where one desires to increase, for example, ease of handling the reaction mass, solvents such as ketones (e.g., acetone, methyl ethyl ketone, and methyl isobutyl ketone), alcohols (e.g., methanol, ethanol, iso-propyl alcohol, butyl alcohol and glycols), or aqueous solvents (e.g., water, a mixture of water and alcohol and a mixture of water and ketone) can be employed. The desired end products, i.e., the bis-tribromophenoxy compounds, can be recovered from the reaction mass via various methods know to those skilled in the art. Where the end product requires recovery via crystallization, various aromatic solvents, such as benzene, toluene, xylene, dichlorobenzene and the like, can be used.

Specifically, the bis-tribromophenoxy compounds are prepared according to the following reactions:

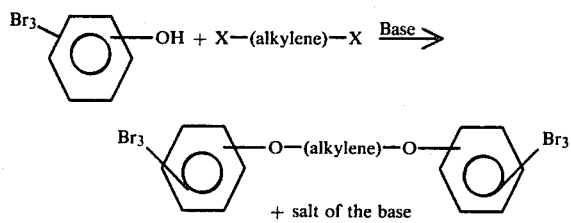

In the above reaction, X is halogen, preferably bromine.

The above reaction is conducted at temperatures ranging from the freezing point of the initial reaction mass to the boiling point thereof. Preferably the temperatures are from about 40° C. to about 200° C. and more preferably from about 50° C. to about 175° C. It is to be understood that the reaction can be conducted uner subatmospheric (e.g., 1/10–8/10 atmospheres) pressure. Preferably, the reaction is carried out at atmospheric pressure.

The above described processes can be carried out with conventional, readily available chemical processing equipment. For example, a conventional glass-lined vessel provided with heat transfer means, a reflux condenser and a mechanical stirrer can be advantageously utilized in practicing any of the preferred embodiments of the invention described in preparing the bis-phenoxy examples set forth herein.

The flame-retarded polystyrene compositions of this invention contain a poly(brominated phenylene oxide) condensation product which is derived from tribromophenol; this condensation product is a branched polymer having a hydroxyl number of from 2.8 to about 30 and the structural formula

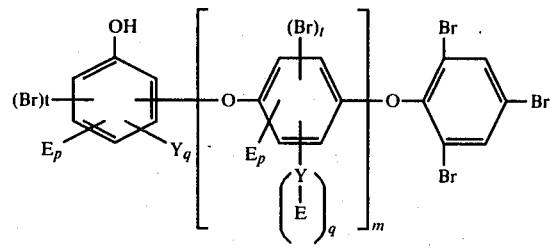

wherein each repeating unit set out within the brackets of the structural formula is attached in an ortho or para configuration to its phenyl and phenoxy moiety; and wherein E is an end group of the formula

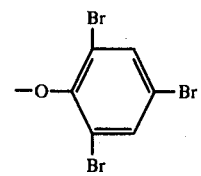

Y is a side chain of the same structure and configuration as said repeating unit; the substituents Br, E and Y on each phenyl ring are attached only to the ortho or para positions relative the hydroxyl group in the structural formula and the oxygen atom in the repeating unit; each t, p and q are independently the integer 0 or 1, provided that the sum of t plus p plus q equals 2, and provided that from about 10 to about 80 percent of the repeating units have the side chain and end unit —Y—E attached thereto; and m is an integer such that the total molecular weight of the polymer ranges from about 2,000 to about 20,000.

The poly(brominated phenylene oxide) condensation product contains from about 17 to about 31 percent (by weight) of carbon, from about 0 to about 1.0 percent (by weight) of elemental hydrogen, from about 3 to about 8 percent (by weight) of elemental oxygen, and at least about 60 percent (by weight) of elemental bromine. It is preferred that this product contain from about 62 to about 66 percent (by weight) of elemental bromine.

It is preferred that the poly(brominated phenylene oxide) product used in the composition of this invention, when fused to form test specimens 0.125" thick, have a notched Izod impact strength of less than about 0.5 foot-pounds per inch of notch (ASTM D256), an elongation of less than about 2.0 percent, and a tensile strength of less than about 200 pounds per square inch.

The novelty and unexpected desired properties of the polymer described above are attributed to both the chemical as well as its structural configuration. First the polymer, because it is a condensation product of a phenol, necessarily has a residual hydroxyl group. This group can be titrated and accordingly the polymer has a hydroxyl number dependent on its molecular weight. As stated, this hydroxyl number typically ranges from 2.8 to about 30 mg per gram of sample.

It has also been found that the condensation of tribromophenol as described herein results in a 1-2 and 1-4 substitution of bromine relative the phenolic moiety. Therefore, each repeating phenoxy group in the polymer is attached to an ortho or para position relative the phenolic group on the adjacent ring. Thus, any two repeating units have the following structure configuration

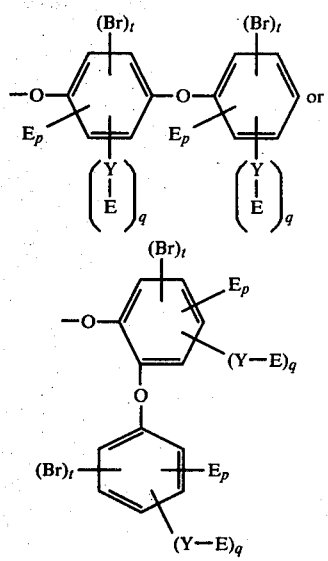

wherein Y, E, t, p and q are as heretofore described. Similarly, the side chains represented by Y and the end groups represented by E are attached to the ortho or para position of the respective phenoxy ring.

An important aspect of the preferred fire retardant condensation product is its branching i.e. the existence of side groups on otherwise lienar polymer backbone. These side groups can be one or more repeating units as in the backbone of the polymer terminated by an end group or simply an end group by itself. The degree of branching in the preferred product can vary such that at least one in ten of the phenoxy units are substituted by a side chain or end group and as many as eight in 10 are so substituted. It is believed that this degree of branching significantly contributes to the non-blooming properties of polyester compositions containing the preferred product.

The preferred condensation product of the present invention has a number average molecular weight that ranges from about 2000 to about 20,000, and most preferably from about 2,000 to about 12,000 as determined by vapor phase osmometry (VPO).

The poly(brominated phenylene oxide) product may be prepared by any of several methods well known to those skilled in the art. Generally, the brominated phenol is contacted with an effective amount of activating agent and allowed to condense for a period of up to 48 hours at a temperature of up to about 300 degrees centigrade. Suitable activating agents include, without limitation, heat, light, organic and inorganic peroxides such as benzoyl peroxide, hydrogen peroxide, dimethane sulfonyl peroxide, lauroyl peroxide, caprylyl peroxide, succinic peroxide, acetyl peroxide, p-tertiarybutyl benzoyl peroxide, tertiary-butylperoxy isopropyl carbonate peroxide, hydroxyheptyl peroxide, cyclohexane peroxide, 2,5-dimethylhexane peroxide, di-tertiarybutyl diperphthalate peroxide, tertiary butyl perbenzoate peroxide, and the like; azo compounds, such as azobisisobutyronitrile, for example; persulfates, such as ammonium persulfate, potassium persulfate, and sodium persulfate; hypochlorites; ferricyanides; ferric chloride; copper salts wherein the copper has a valency of one or two such as, e.g. cuprous-2,4,6-tribromophenate, cupric-2,4,6-tribromophenate, cuprous chloride, cupric chloride, cuprous nitrate, cupric nitrate, cuprous sulfate, cupric sulfate, mixtures of one or more of the aforementioned salts, etc.; metal oxides, such as lead oxide, mercury oxide, silver oxide, and the like; halogen, such as iodine, bromine, and chlorine; lead tetracetate; sodium bis-muthate; etc. Generally, any of the activators known to promote free radical chain initiation may be used.

Alternatively, one may use a metal salt of the brominated phenol with the activating agents. Suitable salts which may be utilized include, without limitation, the lithium, sodium, potassium, barium, zinc, and tin salts of the brominated phenol. Other phenolates well known to those skilled in the art may also be used.

The brominated phenol (or the metallic salt derived from it) may be contacted with the activating agent in the solid state. Alternatively, one may conduct the polymerization of the brominated phenol (or its salt) in a suitable inert solvent. In general, any of the inert aqueous or organic solvents in which phenol or its salt are known to be soluble may be used to prepare the flame retarding condensation product. Suitable solvents include, without limitation, water, dimethylsulfoxide, acetone, hexane, methanol, ethanol, propanol, butanol, benzene, toluene, tetrahydrofuran, etc. Aqueous salt solutions wherein the salt is selected from the group consisting of barium chloride, calcium chloride, magnesium chloride, strontium chloride, potassium chloride, lithium chloride, sodium chloride, and the like may also be utilized. Mixtures of organic solvents and water may be used; thus aqueous acetone solutions, benzene and water, aqueous alkaline solutions and organic compounds insoluble in water (such as octyl alcohol, toluene, and heptane), carbon tetrachloride and water, amyl alcohol and water, and the like are suitable.

One of many methods which may be used to prepare this product involves dissolving a metal hydroxide in water and, to the solution thus formed, adding activating agent and the brominated phenol; thereafter the reaction mixture is maintained at a specified temperature.

In this method, an emulsifying agent may be used to suspend the condensation product in aqueous media; when so used, from about 0.1 to about 5.0 percent of it (by weight of water in the hydroxide solution) should be present in the reaction mixture.

In this method, an alkali or alkaline earth metal hydroxide may be used. It is preferred to use a metal hydroxide selected from the group consisting of sodium hydroxide, potassium hydroxide, and lithium hydroxide; sodium hydroxide is the most preferred. From about 0.5 to about 5.0 moles of the hydroxide per liter of water is utilized. It is preferred to use from about 1 to about 3 moles of hydroxide per liter of water; it is most preferred to use about 2 moles of the hydroxide per liter of water.

The brominated phenol described hereinabove is added to the reaction mixture at a concentration of from about 0.5 to about 5 moles per liter of water to make up the hydroxide solution in this method. It is preferred to use from about 1 to about 3 moles of phenol per liter of water. It is most preferred that the concentration be about 2 moles of phenol per liter of water.

In this method, although it is not essential, organic solvent may be added to the reaction mixture; any of the organic solvents listed hereinabove may be utilized.

When organic solvent is used, it is preferred that from 1 to about 20 percent of it (by volume of water used to make up the hydroxide solution) be utilized. It is more preferred to use from about 3 to about 10 percent of organic solvent in this process; and it is most preferred to use from about 4 to about 8 percent of organic solvent. Some of the preferred organic solvents include toluene, benzene, chloroform, chlorinated benzenes, and the like.

Activating agent is contacted with the reaction mixture after all of the other components are present in this process. When the activating agent is solid, liquid, or gaseous, at least about $1 \times 10^{-5}$ moles of it (based upon liters of water used to make up the hydroxide solution) is used; it is preferred to use from about 0.01 to about 0.1 moles of these activating agents. This condensation product can be prepared by the general procedure heretofore described. A further more specific exemplary preparation is set forth in the following example.

EXAMPLE I

Sodium tribromophenate (387 grams) dissolved in water to obtain a 37 percent by weight solution is charged into a reaction vessel equipped with stirring and heating means. Hydrochloric acid (1.9 grams; 31.5% concentration) is added and the resulting mixture is warmed to 40° C. with stirring. Potassium persulfate (2.3 grams) is added to the reaction vessel and stirring is continued for a period of about 30 minutes. A reaction temperature of 55° to 60° C. is maintained during this period. After this time the pH of the reaction mixture is adjusted to about 13 by the addition of 50% aqueous caustic soda thereafter hydrazine (1 gram; 64% conc.) is added with stirring. Stirring is continued for a period of 15 minutes and the reaction mixture is thereafter heated to a temperature of 95° to 100° C. with further stirring for a period of 4 hours. After this time the mixture is cooled to room temperature and the desired product is recovered by filtration and dried.

The third component of the instant flame retardant plastic composition are certain compounds which when used with the bis-phenoxy compounds, and the poly(brominated phenylene oxides) promote a cooperative effect therebetween and thus enhance the flame retardancy of the resultant plastic composition. These "enhancing agents" comprise e.g., the oxides and halides of groups IVA and VA of the Periodic Table such as, e.g., the oxides and halides of antimony, bismuth, arsenic, tin, lead and germanium; antimony oxychloride, antimony chloride, antimony oxide, stannic oxide, stannic choride, arsenous oxide, arsenous chloride, and the like may be used. Organic and inorganic compounds of phosphorus, nitrogen, boron, and sulfur (such as e.g., triphenyl phosphate, ammonium phosphate, zinc borate, thiourea, urea, stannic sulfide, and the like) may also be utilized. Oxides and halides of titanium, vanadium, chrominum, manganese, iron, niobium, molybdenum, copper, zinc, mangesium (such as, e.g., titanium dioxide, titanium chloride, vanadium pentoxide, chromic bromide, manganous oxide, molybdenum, trioxide, ammonium molybdate) may also be utilized. Hydrates of the aforementioned such as, e.g., stannic oxide hydrate, and lead hydrate also are effective. The preferred enhancing agents are the oxides of antimony, arsenic and bismuth. However, any compound which on decomposition, as by ignition, yields, these oxides would be suitable. Thus, some organic antimonates are preferred. The enhancing agents disclosed in U.S. Pat. No. 3,205,196 are also suitable for use.

Antimony oxide is the antimony compound that is preferred for use in the present invention. However, many organic antimony compounds are suitable (such as the antimony salts of organic acids and their pentavalent derivatives disclosed in U.S. Pat. No. 2,996,528). Compounds of this class include antimony butyrate, antimony valerate, antimony caproate, antimony heptylate, antimony caprylate, antimony pelargonate, antimony caproate, antimony, cinnamate, antimony anisate, and their pentavalent dihalide derivatives. Likewise, the esters of antimonous acids and their pentavalent derivatives disclosed in U.S. Pat. No. 2,993,924 (such as tris [n-octyl] antimonite, tris [2-ethylhexyl] antimonite, tribenzyl antimonite, tris [2-chloroethyl] antimonite, tris [chloropropyl] antimonite, and tris [2-chlorobutyl] antimonite) may be used.

These three components, i.e., the bis-phenoxy compound, the poly (brominated phenylene oxide), and the enhancing agent, when added to polystyrene copolymers, impart flame retardancy thereto. It is to be understood that the term polystyrene as used herein means polymers containing more than 60% styrene (phenylethylene, vinyl benzene, styrol, cinnamene) $C_6H_5CH=CH_2$ or other unsaturated aromatic monomers comprised of variously substituted styrene derivatives. This term also includes rubber-modified impact-resistant polystyrene (HIPS) and copolymers of styrene such as styrene-acrylonitrile (sometimes referred to in the trade as "SA" or "SAN"). Of these, rubber-modified high impact polystyrene is preferred.

It is to be understood that the polystyrene used in the composition of this invention can be a "virgin" material. Alternatively, the polystrene can have additives already contained therein or added concurrently with or after the addition of the bisphenoxy compounds, poly(brominated phenylene oxides), and enhancing agents.

The bis-phenoxy compounds, poly(brominated phenylene oxides), and enhancing agents can be incorporated into the polystyrene at any processing stage in order to prepare the plastic compositions. In general, this is undertaken prior to fabrication either by physical blending or during the process of forming polystyrene. Where one so desires, the bis-phenoxy compounds and/or poly(brominated phenylene oxides) and/or enhancing agents may be micronized into finely divided particles prior to incorporation into the polystyrene.

It is also within the scope of the present invention to employ other materials in the present invention compositions where one so desires to achieve a particular end result. Such materials include, without limitation, adhesion promoters, fillers, antioxidants, antistatic agents, antimicrobials, colorants, flame retardants such as those listed on pages 456–458, *Modern Plastics Encyclopèida, ibid.* (in addition to the new class of flame retardants described herein), heat stabilizers, light stabilizers, pigments, plasticizers, preservatives, ultraviolet stabilizers, fillers and additives, and the like.

Suitable fillers include, e.g., materials such as glass, carbon, cellulosic fillers (wood flour, cork and shell flour), calcium carbonate (chalk, limestone, and precipitated calcium carbonate), metal flakes, metallic oxides (aluminum, beryllium oxide and magnesia), metallic powders (aluminum, bronze, lead, stainless steel and zinc), polymers (comminuted polymers and elastomer-plastic blends), silica products (diatomaceous earth, novaculite, quartz, sand, tripoli, fumed colloidal silica, silica aerogel, wet process silica), silicates (abestos, kaolinite, mica, nepheline syenite, talc, wollastonite, aluminum silicate and calcium silicate), and inorganic compounds such as barium ferrite, barium sulfate, molybdenum disulfide and silicon carbide.

The above-mentioned materials, including filler, are more fully described in *Modern Plastics Encyclopedia*, ibid.

The amount of the above described materials employed in the present invention compositions can be any quantity which will not substantially adversely affect the desired results derived from the present invention compositions. Thus, the amount used can be zero (0) percent, based on the total weight of the composition, up to that percent at which the composition can still be classified as a plastic. In general, such amount will be from about 0%, to about 75% and, preferrably from about 1% to about 50%.

The polystyrene composition of the present invention contains an amount of bis-tribromophenoxy compound and poly(brominated phenylene oxide) and the enhancing agent which will effectively render said composition flame retardant. In general, the amount of bis-tribromophenoxy compound plus poly(brominated phenylene oxide) plus enhancing agent used is from about 2% to about 35% by weight (based on the total weight of the composition). Preferably, the amount employed is from about 5% to about 30% by weight, with an amount of from about 10% to about 20% being more preferred. It is to be understood that any amount can be used as long as it does not adversely effect the chemical and/or physical and/or mechanical properties of the plastic compositions.

The bis-tribromophenoxy compound and the poly(brominated phenylene oxide) are present in a ratio of from about one part by weight of the bis-tribromophenoxy compound to about nine parts by weight of poly(brominated phenylene oxide) to from about nine parts by weight of the bis-tribromophenoxy compound to about one part by weight of the poly(brominated phenylene oxide). It is preferred to use from about three parts by weight of the bis-tribromophenoxy compound to about one part by weight of the poly(brominated phenylene oxide) to from about one part by weight of the bis-tribromophenoxy compound to about three parts by weight of poly(brominated phenylene oxide).

Generally, the amount of enhancing agent used (based on the amount of bis-tribromophenoxy compound plus poly(brominated phenylene oxide used) is from about one part (by weight) to about one-eighth part (by weight). It is preferred to use from about one-sixth part (by weight) to about one-half part by weight.

Thus, for example, a typical preferred composition may contain 4% of the bis-tribromophenoxy compound, 11% of the poly(brominated phenylene oxide), and 3% of the enhancing agent.

One of the critical features of the polystyrene composition of this invention is the unusually high flame retardancy thereof.

The significance of light stability of plastic compositions is recognized in the art; see, e.g., the book entitled "The Measurement of Appearance" by Mr. Richard S. Hunter (Hunter Associates Laboratory, Inc., 9529 Lee Highway, Fairfax, Va.) 1973, which publication is hereby incorporated by reference.

The polystyrene compositions of the present invention are both flame retardant and non-discolored, i.e., have a relatively low E value (the higher the E value the greater this discoloration).

Another critical feature of the present plastic composition described herein is the relatively high heat distortion temperature thereof. This feature is important when the plastic compositions are used close to sources of heat, such as when they are formed into television and radio cabinets. This feature is also important in demolding plastic articles of manufacture; when these articles contain polymers with high heat distortion temperatures, they can be removed from the mold at relatively high temperatures without having to cool them prior to demolding and with only a minimal amount of distortion.

Generally, compounds of Formula I, when added to polystyrene, even with the aforedescribed enhancing agents, do not result in plastic compositions having the requisite heat distortion temperatures. However, when the aforedescribed poly(brominated phenylene oxides) are added to these compositions, the resultant plastic compositions have the requisite heat distortion temperatures and all of the aforedescribed desirable physical and flame retardant properties.

Another advantage of the present invention is that the fire retardant system, i.e., the bis-tribromophenoxy compound and poly(brominated phenylene oxide), can be readily compounded into polystyrene, particularly high impact polystyrene, using normally accessible single screw extrusion equipment since the bis-tribromophenoxy compound and the poly(brominated phenylene oxide), can be readily compounded into polystyrene, particularly high impact polystyrene, using normally accessible single screw extrusion equipment since the bis-tribromophenoxy compound and the poly(brominated phenylene oxide) are melt blendable. With many other flame retardant systems, i.e., decabromobiphenyl oxide, it is essential to compound the flame retardant into polystyrene, particularly high impact polystyrene, using special, expensive, high intensity mixing equipment such as a twin screw extruder. This is necessitated by the high melting points of some of these prior art flame retardants such as decabromobiphenyl oxide ($\approx 300°$ C.). If such equipment is not used, erratic flame retardancy and physical properties can result.

A second embodiment of the present invention is a three-component flame retardant additive composition for flame retarding polystyrene compositions. The additive mixture is comprised of a bis-tribromophenoxy compound of Formula I, a poly(brominated phenylene oxide) described herein, and the aforementioned enhancing agent. Generally, the flame retardant additive composition contains in percent by weight, from about 5% to about 80% of the bis-tribromophenoxy compound, from about 5% to about 80% of the poly(brominated phenylene oxide) and from about 11 to about 50% of the enhancing agent; preferably it contains from about 16% to about 65% of the bis-tribromophenoxy compound, from about 16% to about 65% of the poly(brominated phenylene oxide), and from about 14% to about 33% of the enhancing agent.

The flame retardant additive composition can be added to the polystyrene plastic composition either during the production of the polystyrene polymer itself or after the formation of the polystyrene polymer but during the formulation of the plastic composition. Incorporation of the additive composition is achieved by merely adding, with mixing, the additive to the composition containing the styrene monomer (if the additive composition is added during the polystyrene formation step) or the polystyrene-plastic containing composition (if the additive is added after the polymerization process).

The following examples illustrate the claimed invention but are not to be deemed limitative thereof. Unless otherwise specified, all parts are by weight, all temperatures are in degrees centigrade, all weights are in grams, and all volumes are in millimeters.

EXAMPLES

High impact polystyrene plastic compositions were prepared according to the procedure set forth hereinafter and were subjected to the following tests in order to ascertain comparative properties of the resultant plastic compositions:

(1) Flammability
  (a) Oxygen Index, O.I.: ASTM Test No. D 2863-70
  (b) UL 94: UL 94 procedure described hereinafter
(2) Notched Izod Impact: ASTM Test No. D 256-70
(3) Heat Deflection Temperature (HDT): ASTM Test No. D 648-72
(4) Gardner Impact The plastic materials which were subject to the above described tests were prepared in the following manner. With the exception of the "base resin", the particular additive or additives were incorporated into the polystyrene polymer plastic material (Cosden 825 TV-PI, a product of Cosden Oil and Chemical Company) by addition to a Brabender Prep Center Mixer ("Measuring Head", Model &6, C. W. Brabender Instruments Inc., South Hackensack, N.J.). The mixer was equipped with a pair of roller type blades positioned with a head provided with heat transfer means. The resultant mixture was heated to about 205° C.; at this temperature it was in a molten state. Each formulation was discharged from the mixer and, upon cooling, solidified and was ground into chips. The chips were subjected to injection molding in a one (1) ounce Newbury Injection Molder (Model HI-30 RS, manufactured by Newbury Industries, Inc., Newbury, Ohio) by placing said chips therein and utilizing a 60-second molding cycle with a ram pressure of 2000 psi. The ships contained in said molder were subjected to heat transfer means supplied thereto in order to melt said chips, and the molten plastic was then injected into a mold in order to provide solid samples (after cooling) for testing.

Portions of the molded specimens of each formulation of Examples 2 thru 6 prepared according to the above described procedure were subjected to two different flammability tests, i.e., UL 94 and ASTM D 2863-70. The UL 94 test is fully described in Underwriter's Laboratories bulletin entitled UL 94, Standard for Safety, First Edition, September 1972. ASTM No. D 2863-70 describes a flammability test which correlates ease of extinction of a plastic specimen to the available oxygen in its immediate environment; this correlation is stated as an Oxygen Index, ("O.I.") level which is predicated upon the percent of oxygen (by volume) in the gaseous medium which is required to just provide a steady state of continuous burning of the plastic specimen. This ASTM method is fully described in 1971 Annual Book of ASTM Standards-Part 27 (published by the American Society for Testing and Materials, 1916 Ract Street, Philadelphia, PA.).

Table I shows that the polystyrene/$Sb_2O_3$/bisphenoxy compound/poly(dibromophenylene oxide) combination has excellent flame retardant properties, good heat deflection temperatures, and acceptable impact strength.

In Examples 7 thru 9, molded specimens prepared substantially in accordance with the above described procedure were subjected to a color determination test (the Gardner Colorimeter Test) to determine discoloration. In the Gardner Colorimeter Test, a Gardner XL10-CDM colorimeter was used to measure the color development. The surface of each test specimen was measured prior to and following exposure to U.V light. A couple of samples from each molding run were tested and results reported as an average of the two. Example 9 is a comparative example employing the prior art flame retardant decabromobiphenyl oxide. This well known flame retardant requires special equipment to be satisfactorily processed. By comparing the light stability results in Table II, it becomes apparent that the composition of Example 9 is visually unacceptable and was materially altered after only 25 hours of exposure.

The plastic compositions which incorporate the four-component polystyrene/enhancing agent/bis-phenoxy compound/poly(brominated phenylene oxide) system possess characteristics which have been heretofor unobtainable in the prior art, i.e., good flame retardancy, good heat distortion temperature, and acceptable physical properties.

TABLE I

| Example | 2 Base Resin | 3 | 4 | 5 | 6 |
|---|---|---|---|---|---|
| Additive | | | | | |
| 1,2-bis(2,4,6-tribromophenoxy)ethane | 0[1] | 15 | 3.75 | 6 | 9 |
| poly(dibromophenylene oxide) | 0 | 0 | 11.25 | 9 | 6 |
| $Sb_2O_3$ | 0 | 3 | 3 | 3 | 3 |
| Flammability and Physical Property Data | | | | | |
| Izod Impact, ft-lb/in. (0.10" notch) | 2.76 | 2.20 | 2.16 | 2.12 | 2.09 |
| L 94 Class, ⅛" thickness | HB | V-0 | V-0 | V-0 | V-0 |
| Heat Deflection Temperature, (Annealed 1 hr. at 170° F.) °F. at 264 psi | 193 | 157 | 187 | 182 | 172 |
| Oxygen Index % at 73° F. | 18.0 | 24.0 | 23.5 | 23.5 | 24.0 |
| Gardner Impact, in-lb. | 110 | 115 | 50 | 50 | 60 |

[1]Percent by weight of total composition

TABLE II

| Example | 7 Base Resin | 8 | 9 Comparative |
|---|---|---|---|
| Additive | | | |
| 1,2-bis(2,4,6-tribromophenoxy)ethane | 0[1] | 3.75 | 0 |
| poly (dibromophenylene oxide) | 0 | 11.25 | 0 |
| $Sb_2O_3$ | 0 | 3.0 | 2.4 |
| decabromobiphenyl oxide | 0 | 0 | 12 |
| Physical Data | | | |
| E Color Value Hours[2] | | | |
| 25 | 1.9 | 8.2 | 32.3 |
| 50 | 4.4 | 11.0 | 34.8 |
| 75 | 5.7 | 12.7 | 36.1 |
| 100 | 6.2 | 13.8 | 36.0 |
| 200 | 9.2 | 15.8 | 47.2 |
| 300 | 12 | 16.6 | 46.5 |

TABLE II-continued

| Example | 7 Base Resin | 8 | 9 Comparative |
|---|---|---|---|
| 500 | 18 | 18.9 | 49.1 |

(1) Percent by weight of total composition
(2) Exposure to UV light (Xenon Arc)

The above examples have been described in the foregoing specification for the purpose of illustration and not limitation. Many other modifications and ramifications will naturally suggest themselves to those skilled in the art based on the disclosure. These are intended to be comprehended as within the scope of this invention.

The embodiments of the invention in which an exclusive property or privilege is claimed are defined as follows:

1. A flame retardant plastic composition comprising polystyrene polymer and from about 2 to about 35 weight percent of a flame retardant additive system which contains (i) from about one to about three parts by weight a bis-phenoxy compound of the formula

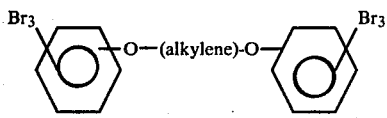

wherein alkylene is a straight chain carbon group having from one to six carbon atoms; (ii) from about one-fourth part to about 6 parts of a flame retardant enhancing agent selected from the group consisting of oxides and halides of Group IV-A and V-A of the Periodic Table of Elements; and (iii) from about one to about three parts by weight of a poly(brominated phenylene oxide) condensation product derived from tribromphenol, wherein said condensation product is a branched polymer having a hydroxyl number of from 2.8 to about 30 and the structural formula

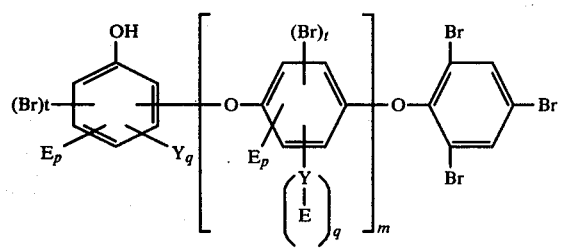

wherein each repeating unit set out within the brackets of the structural formula is attached in an ortho or para configuration to its adjacent phenyl and phenoxy moiety; and wherein E is an end group of the formula

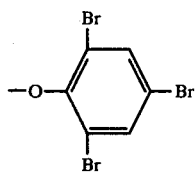

Y is a side chain of the same structure and configuration as said repeating unit; the substituents Br, E and Y on each phenyl ring are attached only to the ortho or para positions relative the hydroxyl group in the structural formula and the oxygen atom in the repeating unit; each t, p and q are independently the integer 0 or 1, provided that the sum of t plus p plus q equals 2, and provided that from about 10 to about 80 percent of the repeating units have the side chain and end unit —Y—E attached thereto; and m is an integer such that the total molecular weight of the polymer ranges from about 2,000 to about 20,000.

2. The composition of claim 1, wherein each enhancing agent is antimony trioxide.

3. A flame retardant additive composition for polystyrene plastic compositions consisting essentially of (i) from about one to about three parts by weight of a bis-phenoxy compound of the formula

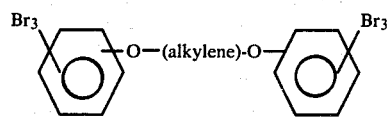

wherein alkylene is a straight chain carbon group having from one to six carbon atoms; (ii) from about one-fourth to about six parts of a flame retardant enhancing agent selected from the group consisting of oxides and halides of Group IV-A and V-A of the Periodic Table of Elements; and (iii) from about one to about three parts by weight of a poly(brominated phenylene oxide) condensation product derived from tribromophenol, wherein said condensation product is a branched polymer having a hydroxyl number of from 2.8 to about 30 and the structural formula

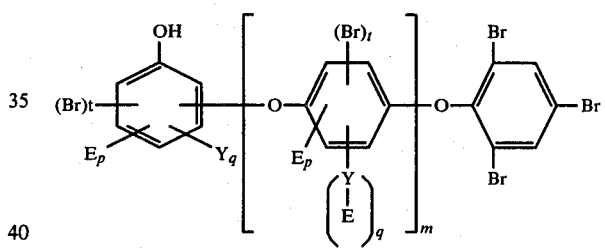

wherein each repeating unit set out within the brackets of the structural formula is attached in an ortho or para configuration to its adjacent phenyl and phenoxy moiety; and wherein E is an end group of the formula

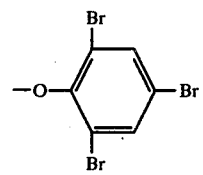

Y is a side chain of the same structure and configuration as said repeating unit; the substituents Br, E and Y on each phenyl ring are attached only to the ortho or para positions relative the hydroxyl group in the structural formula and the oxygen atom in the repeating unit; each t, p and q are independently the integer 0 or 1, provided that from about 10 to about 80 percent of the repeating units have the side chain and end unit —Y—E attached thereto; and m is an integer such that the total molecular weight of the polymer ranges from about 2,000 to about 20,000.

4. The composition of claim 3, wherein said enhancing agent is antimony trioxide.

* * * * *

UNITED STATES PATENT AND TRADEMARK OFFICE
CERTIFICATE OF CORRECTION

PATENT NO. : 4,280,952

DATED : July 28, 1981

INVENTOR(S) : Richard C. Nametz and Paul O. Moore

It is certified that error appears in the above-identified patent and that said Letters Patent are hereby corrected as shown below:

Column 2, line 10, after "New" insert --York--.

Column 2, line 29, "product" should read --produce--.

Column 3, lines 11, 12, and 13, delete the sentence "It is important that, in addition to retaining good physical characteristics, three properties of the polystyrene plastics."

Column 3, line 21, "at" should read --art--.

Column 3, line 30, "first" should read --fire--.

Column 4, line 28, "ae" should read --are--.

Column 5, line 22, "know" should read --known--.

Column 5, line 48, "uner" should read --under--.

Column 6, line 15, after "its" insert the word --adjacent--.

UNITED STATES PATENT AND TRADEMARK OFFICE
CERTIFICATE OF CORRECTION

PATENT NO. : 4,280,952

DATED : July 28, 1981

INVENTOR(S) : Richard C. Nametz and Paul O. Moore

It is certified that error appears in the above-identified patent and that said Letters Patent are hereby corrected as shown below:

Column 7, line 32, "lienar" should read --linear--.

Column 10, line 55, "Encyclopeida" should read --Encyclopedia--.

Column 13, line 32, "&6" should read --R6--.

Column 13, line 44, "ships" should read --chips--.

Column 16, line 7, "each" should read --said--.

Signed and Sealed this

Twenty-second Day of December 1981

[SEAL]

Attest:

GERALD J. MOSSINGHOFF

*Attesting Officer*　　*Commissioner of Patents and Trademarks*